United States Patent
Miller et al.

(10) Patent No.: US 9,821,765 B1
(45) Date of Patent: Nov. 21, 2017

(54) LOCKABLE STEERING WHEEL QUICK-RELEASE UNIT WITH ANTI-THEFT PROTECTION

(71) Applicant: NRG Innovations, City of Industry, CA (US)

(72) Inventors: Chris Miller, City of Industry, CA (US); Jason Chou, City of Industry, CA (US)

(73) Assignee: NRG Innovations, City of Industry, CA (US)

( * ) Notice: Subject to any disclaimer, the term of this patent is extended or adjusted under 35 U.S.C. 154(b) by 0 days.

(21) Appl. No.: 15/474,696

(22) Filed: Mar. 30, 2017

Related U.S. Application Data

(60) Provisional application No. 62/416,370, filed on Nov. 2, 2016.

(51) Int. Cl.
*E05B 17/18* (2006.01)
*B60R 25/021* (2013.01)
*B62D 1/10* (2006.01)

(52) U.S. Cl.
CPC .......... *B60R 25/02147* (2013.01); *B62D 1/10* (2013.01); *E05B 17/185* (2013.01); *E05B 17/186* (2013.01)

(58) Field of Classification Search
CPC ... B60R 25/02147; B62D 1/10; E05B 17/185; E05B 17/14; E05B 17/142; E05B 17/18; E05B 17/186
USPC .... 70/207, 209, 214, 423–428, 455; 74/548, 74/552; 280/771, 775
See application file for complete search history.

(56) References Cited

U.S. PATENT DOCUMENTS

| | | | | |
|---|---|---|---|---|
| 4,184,692 A * | 1/1980 | Benson | ............... | B23B 31/1071 279/75 |
| 4,645,372 A * | 2/1987 | Suzuki | .................. | F16B 21/165 403/316 |
| 4,881,389 A * | 11/1989 | Alfon | .................. | B60R 25/0222 280/775 |
| 5,103,660 A * | 4/1992 | Johnson | .............. | B60R 25/0222 70/163 |
| 6,154,271 A * | 11/2000 | Duc | ...................... | E05B 17/185 355/72 |
| 6,318,756 B1 * | 11/2001 | Papandreou | ............. | B62D 1/10 280/731 |
| 6,481,250 B1 * | 11/2002 | Kuo | ........................ | E05B 17/14 70/367 |
| 6,802,193 B1 * | 10/2004 | Long | .................... | B60R 25/0222 292/352 |
| 7,527,293 B1 | 5/2009 | Wang | | |
| 7,610,784 B2 * | 11/2009 | Rohde | ..................... | E05B 17/18 70/34 |
| 8,347,661 B2 * | 1/2013 | Kaminsky, Jr. | ......... | E05B 67/36 70/417 |

(Continued)

*Primary Examiner* — Lloyd Gall
(74) *Attorney, Agent, or Firm* — Sheridan Ross P.C.

(57) ABSTRACT

A steering column lock comprises a bearing-mounted, free-rotating keyhole cover that covers an underlying locking device. When installed on the steering column of a vehicle, the steering column lock prevents a would-be car thief from grabbing the lock with pliers or another tool and using the lock to turn the steering column and thus drive the vehicle, because rotation of the free-rotating outer cover does not cause rotation of the other portions of the lock.

20 Claims, 10 Drawing Sheets

(56) References Cited

U.S. PATENT DOCUMENTS

| | | | |
|---|---|---|---|
| 9,683,390 B1* | 6/2017 | Liu | E05B 37/025 |
| 2006/0021403 A1* | 2/2006 | Kuo | E05B 17/14 |
| | | | 70/454 |

* cited by examiner

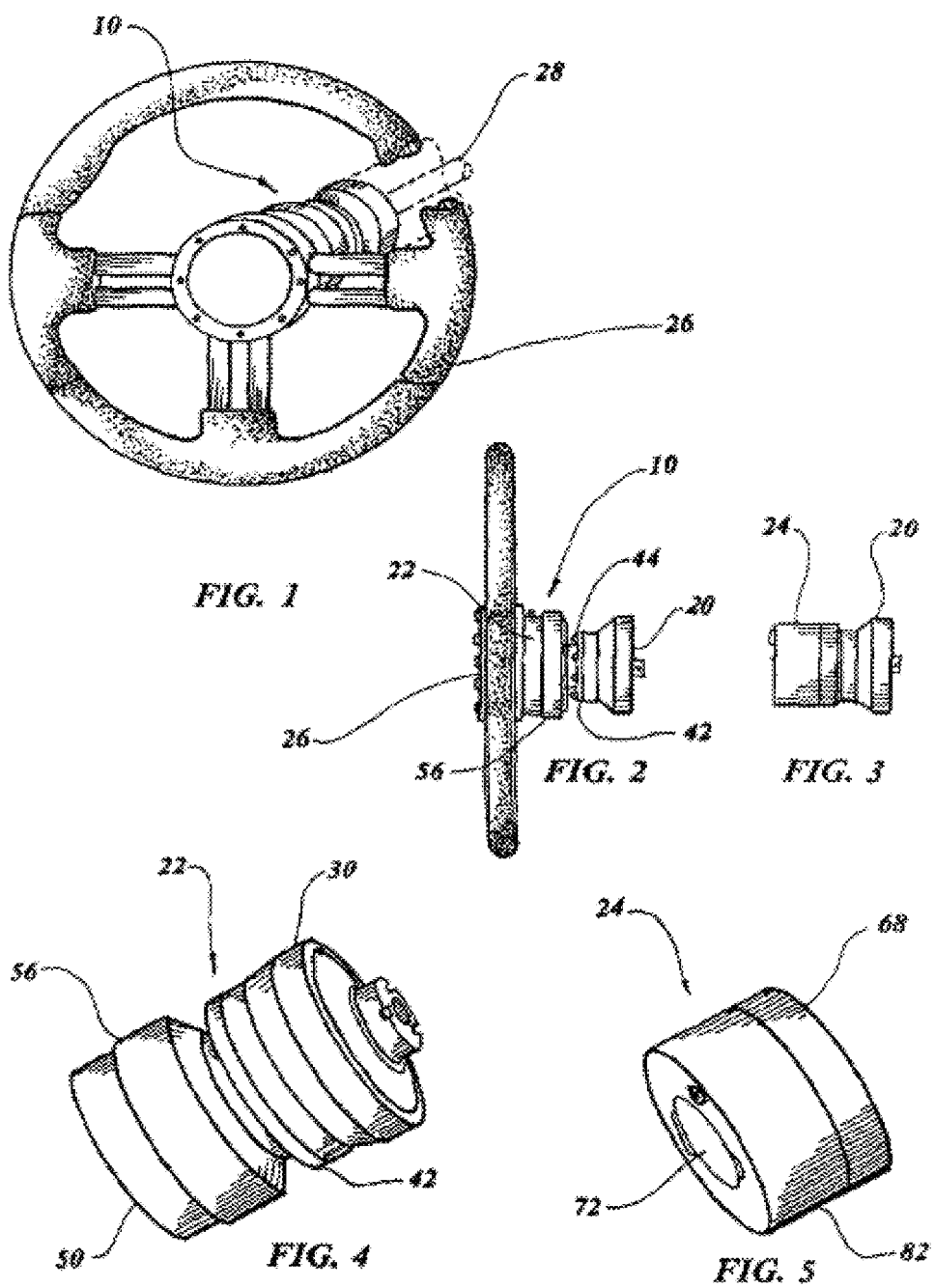

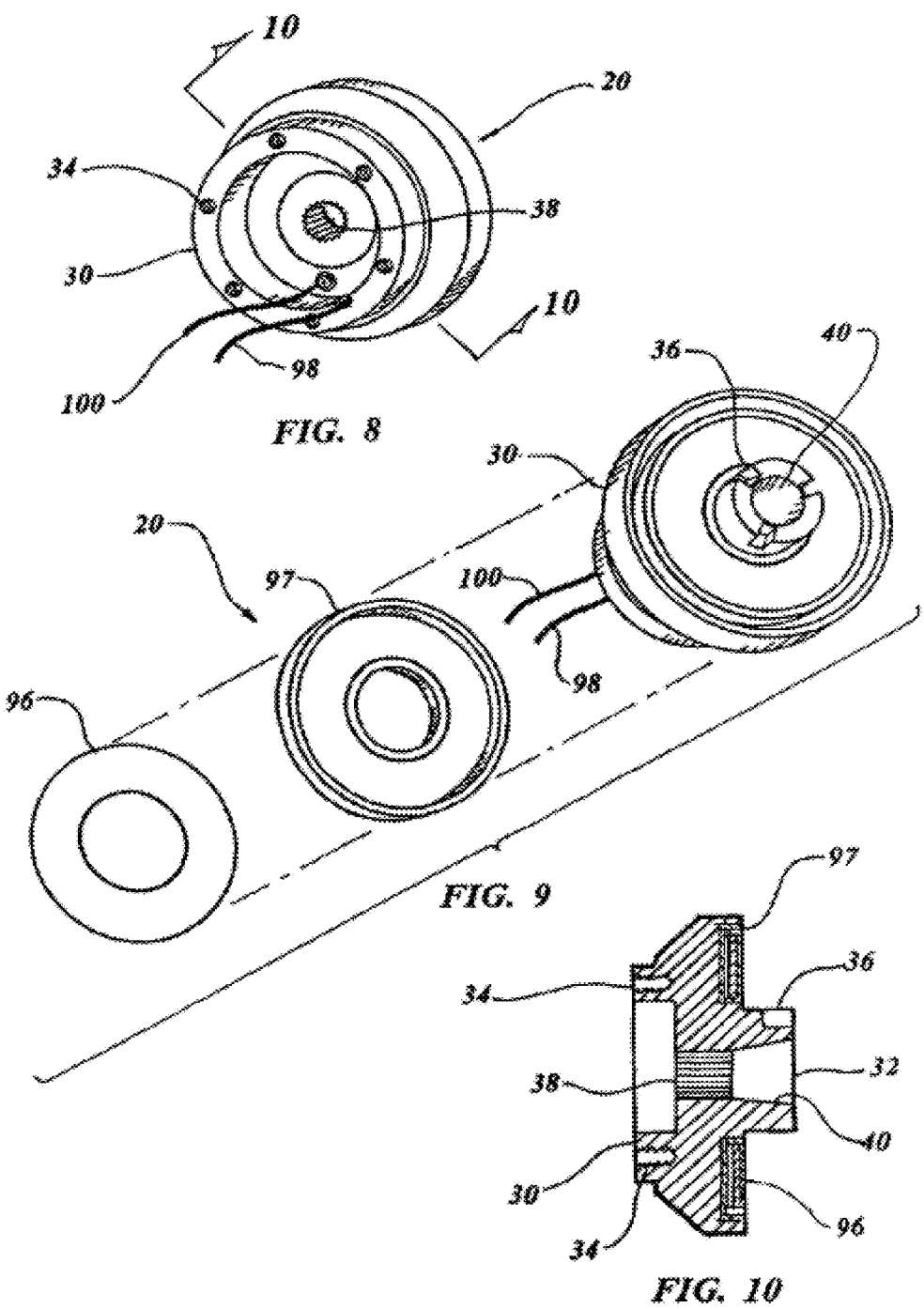

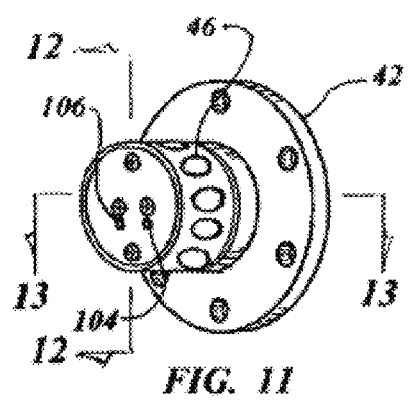
FIG. 11
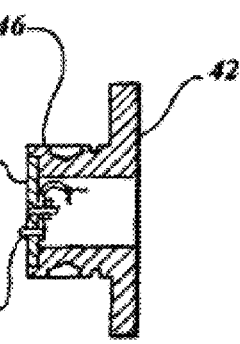
FIG. 12
FIG. 13
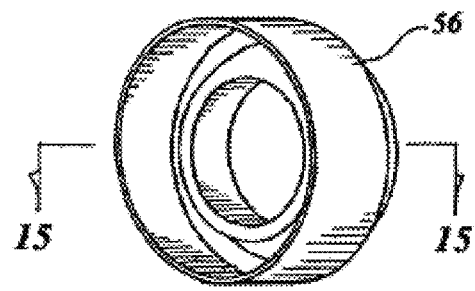
FIG. 14
FIG. 15
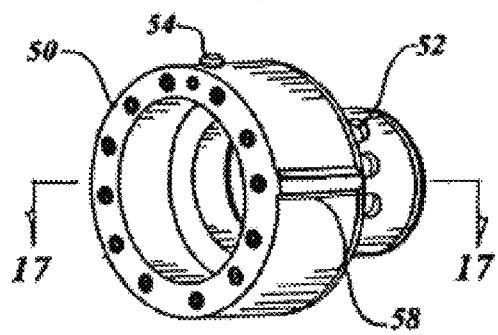
FIG. 16
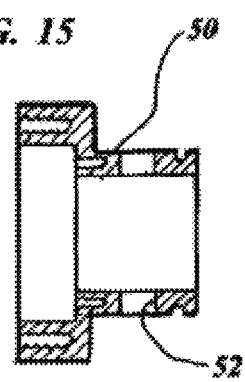
FIG. 17
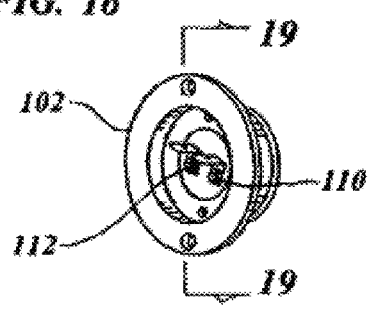
FIG. 18
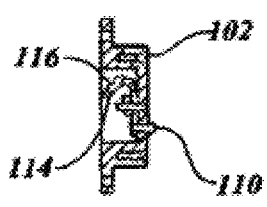
FIG. 19

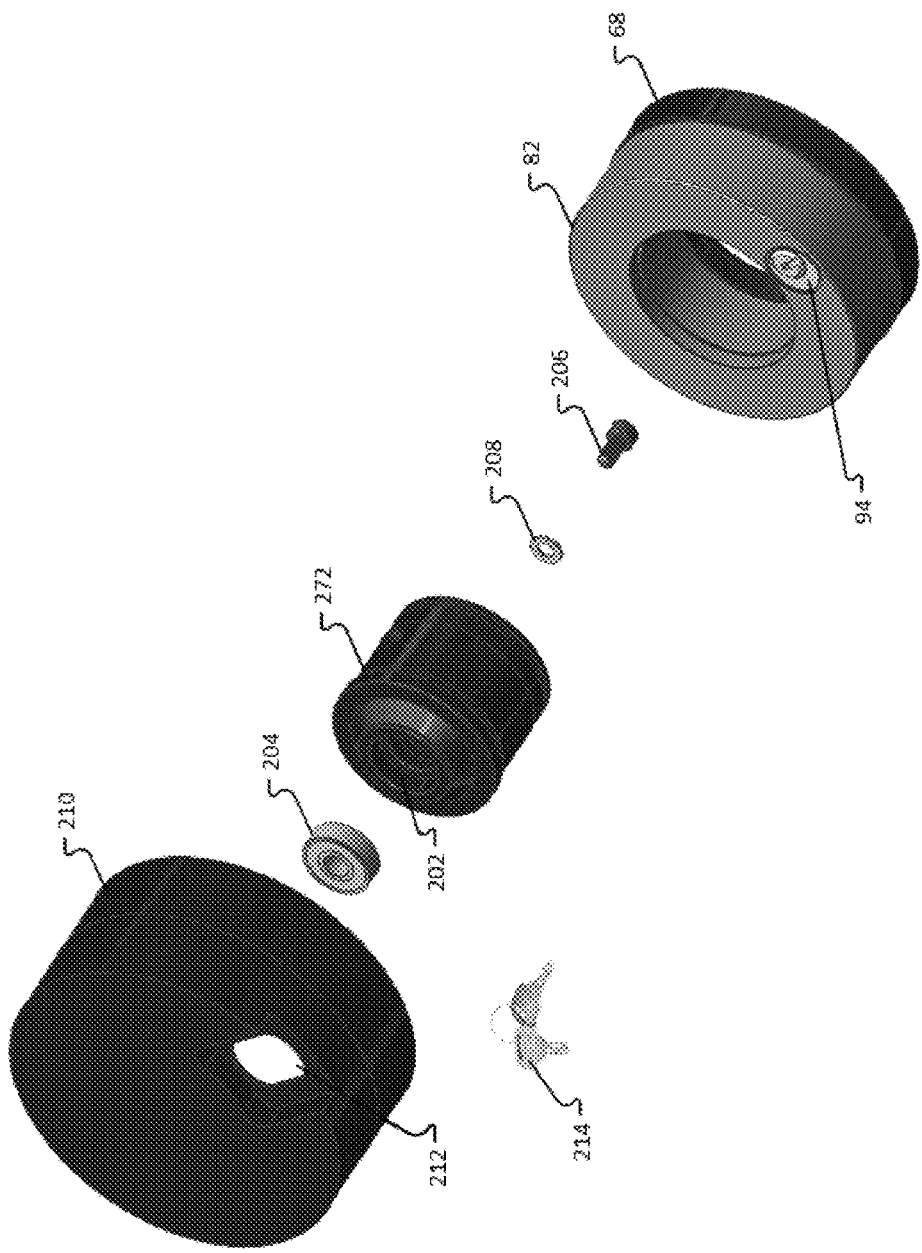

LOCKABLE STEERING WHEEL QUICK-RELEASE UNIT WITH ANTI-THEFT PROTECTION

CROSS-REFERENCE TO RELATED APPLICATIONS

The present application claims the benefit of and, under 35 U.S.C. §119(e), priority to U.S. Provisional Application Ser. No. 62/416,370, filed on Nov. 2, 2016, entitled "Steering Column Lock Mechanism." The entire disclosures of the foregoing application is hereby incorporated by reference, in its entirety, for all that it teaches and for all purposes.

FIELD

This invention relates to the field of anti-theft devices for cars, and more specifically to the field of steering column locks.

BACKGROUND

One way to prevent car theft is to remove the steering wheel of a car when the car is not in use. This prevents potential thieves from being able to drive the vehicle, even if they are able to get the vehicle started. Even so, would-be car thieves may attach their own steering wheel to the steering wheel column of a vehicle from which the owner has removed the vehicle's steering wheel, and thus bypass this theft prevention measure. To prevent this from happening, a vehicle owner can install a steering column lock on the steering column of his or her vehicle.

U.S. Pat. No. 7,527,293, entitled "Lockable Steering Wheel Quick-Release Unit" and which is incorporated herein by reference in its entirety, discloses a lock mechanism for installation between a steering wheel and a steering wheel column that allows for quick-release of the steeling wheel from the steering column. The lock covers a portion of the steering column such that a different steering wheel cannot be installed on the column without first removing the lock.

Prior to the invention disclosed herein, it was not appreciated that even with the use of a lock mechanism such as that disclosed in the '293 Patent, a car thief could use pliers, a wrench or some other mechanism to grasp the lock mechanism and selectively rotate the steering column, thus enabling the thief to steer the vehicle without a steering wheel and despite the presence of the lock.

SUMMARY

It is with respect to the above issues and other problems that the embodiments presented herein were contemplated. More specifically, the present disclosure provides an apparatus that prevents thieves from grasping the lock mechanism and using the lock mechanism to rotate the steering column and steer the vehicle. The apparatus comprises a freely rotating outer cover around a steering wheel lock. This freely rotating outer cover, even if grabbed with pliers or another tool, will rotate without causing the steering column lock itself to rotate, and thus further enhances the security provided by a steering column lock.

According to one embodiment of the present disclosure, a lockable steering wheel quick-release unit for use in an automotive vehicle having a steering shaft and a steering wheel comprises a steering shaft hub; a flanged extending hub; and a lock unit. The steering shaft hub has a center steering shaft bore therethrough for attachment to the automotive vehicle steering shaft, and also has a plurality of flanged hub threaded mounting holes on a centrally positioned bolt circle. The flanged extending hub is attached to the steering shaft hub, with a plurality of threaded fasteners engaging the flanged hub threaded mounting holes. The flanged extending hub has a plurality of peripheral recessed hollows therein. The lock unit comprises: a hollow center cylindrical base having a lock bolt hole therethrough; a cylindrical stationary locking retainer disposed within the hollow center of the base and held in place with a lock ring and a rotation stop pin, wherein the locking retainer has a single ball mounting hole on a first side, a single recessed hollow on an opposed second side; and a bearing mounted on an end thereof; a hollow center cylindrical lock outer cover having a push bolt cavity therein, the lock outer cover having an eccentric recess on a first inner surface of the hollow center, and an opposed concentric recess on a second inner surface of the hollow center, with the outer cover rotatable disposed onto the stationary locking retainer; a first ball disposed within the locking retainer single ball mounting hole that interfaces with the lock outer cover eccentric recess, such that when the lock unit is placed over the flanged extending hub and the lock outer cover is rotated to a locked position, the first ball is forced into one of the flanged extending hub peripheral recessed hollows, and a second ball disposed within the locking retainer recessed hollow interfaces with the concentric recess; thereby limiting the rotational travel of the outer cover relative to the base; a lock device disposed within the push bolt cavity, with a push bolt of the lock device cooperating with the lock bolt hole to prevent rotation of the lock outer cover with respect to the cylindrical base, thereby securing the attachment of the lock unit to the flanged extending hub; and a substantially cylindrical keyhole cover having an open end configured to receive the lock outer cover and the cylindrical base, and a closed end mounted to the bearing for free rotation relative to the cylindrical stationary locking retainer, the closed end having a single aperture therein through which the lock device may be accessed.

The lockable steeling wheel quick-release unit may further comprise: a steering wheel adapter for attachment to the steering wheel, wherein the adapter has a plurality of peripheral ball mounting holes therethrough, with the adapter slideably engaging the flanged extending hub when the lock unit is removed from the flanged extending hub; a plurality of round balls disposed within the adapter peripheral ball mounting holes; and a biased sliding release sleeve slideably extending over the adapter, thereby retaining the plurality of round balls such that when the sliding release sleeve is in a biased position, the plurality of round balls are forced into the flanged extending hub's peripheral recessed hollows and interface with the steering wheel adapter peripheral ball mounting holes, thus securely locking the adapter to the steering shaft hub, and when manually urged away from the vehicle steering shaft, the plurality of round balls are freed, thereby permitting movement of the plurality of round balls away from the flanged extending hub's peripheral recessed hollows and releasing the steering wheel adapter from the flanged extending hub.

The plurality of round balls may be steel ball bearings. The sliding release sleeve may be constructed of anodized aluminum. The steering shaft hub may have at least three turn signal notches for interfacing with a vehicle indicating system. The steering shaft hub may have a female spline on a distal end of the steering shaft bore and a taper within the remainder of the bore. The steering shaft hub may be constructed of powder paint coated aluminum. The flanged extending hub may be constructed of powder paint coated aluminum. The steering wheel adapter may be constructed of powder paint coated aluminum.

The lockable steering wheel quick-release unit may also further comprise electrical connection means for transferring an electrical signal from an automotive horn circuit through the quick-release unit to a horn button on the steering wheel defined as: an insulated slip ring attached to the steering shaft hub, a positive slip ring electrical conductor connected to the slip ring, and a negative slip ring conductor connected to the steering shaft hub, an insulated hub plate that is disposed within the flanged extending hub in electrical communication with the positive slip ring electrical conductor terminating with a first positive contact pin, and the negative slip ring conductor terminating with a first negative contact pin, and an insulated contact adapter having a second positive contact pin in electrical communication with the first positive contact pin, and a second negative contact pin in electrical communication with the first negative contact pin, also an adapter positive electrical conductor attached to the second positive contact pin, along with an adapter negative electrical conductor attached to the second negative contact pin for attachment to a horn button of the steering wheel.

The lockable steering wheel quick-release unit may further comprise an ejection compression spring that is interfaced between the flanged extending hub and the steering wheel adapter, wherein the spring ejects the adapter when released.

The steering wheel adapter may further comprise a captivated release pin extending from an outer peripheral surface of the adapter for releasing the unit from the steering shaft hub when the release sleeve is manually retracted over the adapter. The steering wheel adapter may further comprise a plurality of ribs that extend outward from an outer peripheral surface to prevent wear marks from the sliding movement of the release sleeve. The lockable steeling wheel quick-release unit may further comprise a removal compression spring that is positioned between the steering wheel adapter and the sliding release sleeve for preventing the release of the unit until manually actuated. The steering wheel adapter may further comprise a horn button support ring.

A locking device according to one embodiment of the present disclosure comprises: a cylindrical base comprising a first central bore and a separate lock bolt hole; a lock outer cover comprising a second central bore and a separate push bolt cavity therein, the lock outer cover configured to be removably attached to the cylindrical base with the second central bore in axial alignment with the first central bore; a stationary locking retainer disposed within the first and second central bores, the locking retainer comprising a first open end and a first closed end, and further comprising a bearing mounted on the first closed end; a lock mechanism disposed within the push bolt cavity, with a push bolt of the lock device cooperating with the lock bolt hole to prevent rotation of the lock outer cover with respect to the cylindrical base; and a keyhole cover comprising a second open end and a second closed end, the second closed end mounted to the bearing for free rotation relative to the stationary locking retainer, wherein the keyhole cover defines an interior volume sized to receive the lock outer cover and the cylindrical base, and further wherein the closed end comprises a single aperture through which the lock mechanism may be accessed.

The locking device may further comprise: a steering shaft hub comprising a center steering shaft bore therethrough for attachment to an automotive vehicle steering shaft, the steering shaft hub also comprising a plurality of flanged hub threaded mounting holes on a centrally positioned bolt circle; and a flanged extending hub attached to the steering shaft hub, with a plurality of threaded fasteners engaging the flanged hub threaded mounting holes, the flanged extending hub having a plurality of peripheral recessed hollows therein.

The stationary locking retainer may comprise a single ball mounting hole on a first side, a single recessed hollow on an opposed second side, and a first ball disposed within the single ball mounting hole. The first ball may be configured to selectively engage an internal feature of the lock outer cover when the locking retainer is mounted on the flanged extending hub.

A steering shaft locking device according to another embodiment of the present disclosure comprises a cylindrical lock unit configured to be mounted over an end of an automotive steering shaft and locked into position, the cylindrical lock unit comprising: an open end configured to extend over the automotive steering shaft, a closed end, a bearing mounted to the closed end, and a locking mechanism for selectively locking the cylindrical lock unit into position; and an access cover mounted to the bearing, the access cover extending over the cylindrical lock unit from the closed end to the open end and configured to rotate freely around the cylindrical lock unit, wherein the access cover comprises an aperture through which the locking mechanism may be selectively accessed by rotating the access cover until the aperture is aligned with the locking mechanism. The locking mechanism may be a push bolt locking mechanism operable by a key.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 1 is a partial isometric view of the lockable steering wheel quick-release unit for use in an automotive vehicle attached to a representative custom steering wheel in the preferred embodiment.

FIG. 2 is a right-side view of the lockable steering wheel quick-release unit attached to a custom steering wheel in the preferred embodiment.

FIG. 3 is a right-side view of the lockable steeling wheel quick-release unit with the steering wheel including the remainder of the unit detached and the lock unit in place.

FIG. 4 is a partial isometric view of the lockable steering wheel quick-release unit assembly less the lock in the preferred embodiment.

FIG. 5 is a partial isometric view of the lock unit assembly in the preferred embodiment.

FIG. 8 is a partial isometric view of the steering shaft hub assembly viewed from the front and completely removed from the invention for clarity.

FIG. 9 is an exploded partial isometric view of the steering shaft hub assembly viewed from the rear in the preferred embodiment.

FIG. 10 is cross-sectional view taken along lines 10-10 of FIG. 8.

FIG. 11 is a partial isometric view of the flanged extending hub completely removed from the invention for clarity.

FIG. 12 is a cross-sectional view taken along lines 12-12 of FIG. 11.

FIG. 13 is a cross-sectional view taken along lines 13-13 of FIG. 11.

FIG. 14 is a partial isometric view of the sliding release sleeve completely removed from the invention for clarity.

FIG. 15 is a cross-sectional view taken along lines 15-15 of FIG. 14.

FIG. 16 is a partial isometric view of the steering wheel adapter completely removed from the invention for clarity.

FIG. 17 is a cross-sectional view taken along lines 17-17 of FIG. 16.

FIG. 18 is a partial isometric view of the insulated hub plate completely removed from the invention for clarity.

FIG. 19 is a cross-sectional view taken along lines 19-19 of FIG. 18.

FIG. 27A is an exploded view of a lock unit according to one embodiment of the present disclosure.

DETAILED DESCRIPTION

Figure 6:
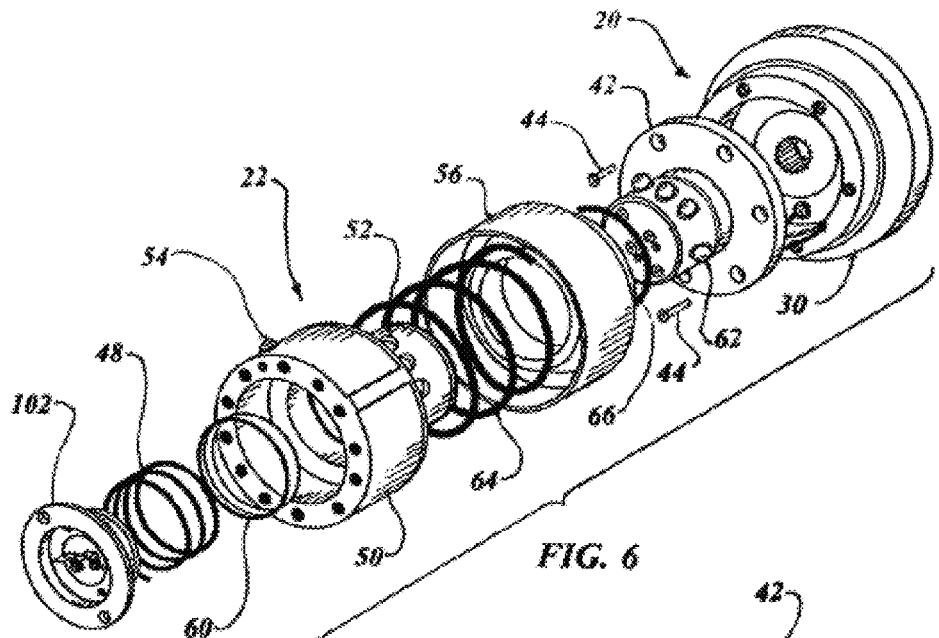
FIG. 6 is an exploded partial isometric view of the lockable steering wheel quick-release unit assembly less the lock in the preferred embodiment.

A lockable steering wheel quick-release unit 10 is first described. This embodiment, as shown in FIGS. 1 through 26, is comprised of three separate elements: a steering shaft hub assembly 20, a quick-release unit assembly 22, and a lock unit 24. FIGS. 1 and 2 illustrate the unit 10 attached to a typical custom steering wheel 26, and in FIG. 3, the lock unit 24 is coupled to the steering shaft hub assembly 20. FIG. 4 depicts the quick-release unit assembly 22 by itself, and FIG. 5 the lock unit 24 is also shown by itself.

The lockable steering wheel quick-release unit 10 is configured for use in an automotive vehicle that has a steering shaft 28 and that incorporates the use of the custom steering wheel 26, which are not part of the invention but are illustrated since they are necessary for completion of the interface utility.

The quick-release assembly 22 includes a steering shaft hub 30 of the quick-release unit 10 having a center steering shaft bore 32 therethrough, shown in FIG. 10 for attachment to the automotive vehicle steering shaft 28, illustrated in FIG. 1. The steering shaft hub 30 also has a plurality of flanged-hub threaded mounting holes 34 on a centrally positioned bolt circle on the end opposite the bore 32. An outwardly-extending protrusion surrounding the bore 32 contains at least three turn signal notches 36 for use with the vehicle's turn indicating system. A female spline 38 on the steering shaft bore 32 is incorporated on a distal end, and a taper 40 is formed within the remainder of the bore 32 to mate with the vehicle's steering shaft 28. The steering shaft hub 30 is preferably constructed of powder paint coated aluminum, however other materials and furnishes may be used with equal ease. The steering shaft hub 30 is shown in a front isometric view in FIG. 8, and a rear isometric exploded view in FIG. 9, with FIG. 10 illustrating the internal construction in cross-section.

The quick-release unit assembly 22 includes a flanged extending hub 42 that is attached to the steering shaft hub 30 by a plurality of threaded fasteners 44 that engage the flanged hub threaded mounting holes 34. The flanged extending hub 42 includes a plurality of peripheral recessed hollows 46 therein and is preferably constructed of powder paint coated aluminum. FIGS. 11-13 depict the flanged extending hub 42 shown alone in both in an isometric view and in cross-sections.

A steering wheel adapter 50 attaches to the custom steering wheel 26, with the adapter 50 including a plurality of peripheral ball mounting holes 52 therethrough. The adapter 50 slideably engages the flanged extending hub 42, as illustrated in FIG. 6. A captivated release pin 54 extends from an outer peripheral surface of the adapter 50 for finally releasing the quick-release unit assembly 22 from the steering shaft hub 30 when a release sleeve 56 is manually retracted over the adapter 50. A plurality of ribs 58 extending outward from an outer peripheral surface of the adapter 50 prevent wear marks from the sliding movement of the release sleeve 56 onto the adapter 50. The adapter 50 is preferably, but not necessarily, also constructed of powder paint coated aluminum. FIGS. 16 and 17 illustrate the adapter 50 alone, and FIG. 6 illustrates the quick-release assembly 22 exploded showing the balance of the quick-release assembly 22 components.

A horn button support ring 60 is disposed within the confines of the adapter 50, as illustrated in FIG. 6, and is used to confine the horn push button of the custom steering wheel 26.

A plurality of balls 62 are disposed within the adapter peripheral ball mounting holes 52 and interface with the recessed hollows 46 of the flanged extending hub 42 during the locking procedure of the quick-release unit assembly 22. The plurality of balls 62 are preferably steel ball bearings, which are plentiful and in constant production throughout the world.

The sliding release sleeve 56 is spring-loaded to slideably extend over the adapter 50, thereby retaining the balls 62 within the adapter 50 when the sliding release sleeve 56 is at rest under the influence of spring loading. The spring loading consists of a removal compression spring 64 that is positioned between the steering wheel adapter 50 and the sliding release sleeve 56, thereby preventing release of the unit assembly 22 until manually actuated. At rest, the balls 62 are forced into the flanged extending hub's peripheral recessed hollows 46, thereby interfacing with the steering wheel adapter peripheral ball mounting holes 52 and securely locking the adapter 50 to the steering shaft hub 30. When the release sleeve 56 is manually urged toward the steering wheel 26, away from the vehicle steering shaft 28, the balls 62 are freed, thus permitting movement away from the flanged extending hub's peripheral recessed hollows 46. The balls 62 fully engage into the steering wheel adapter peripheral ball mounting holes 52, releasing the steering wheel adapter 50 from the flanged extending hub 42. A retaining ring 66 is positioned within a groove in the adapter 50 to maintain the release sleeve 56 slideably within the adapter 50 under the compression of the removal spring 64. FIGS. 14 and 15 illustrate the sliding release sleeve 56 by itself, and FIG. 6 the sliding release sleeve 56 is shown in relationship with the other elements. The sliding release sleeve 56 consists of anodized aluminum construction in the preferred embodiment, as the outside surface is handled for removal, however other materials and finishes may be utilized.

Figure 7:
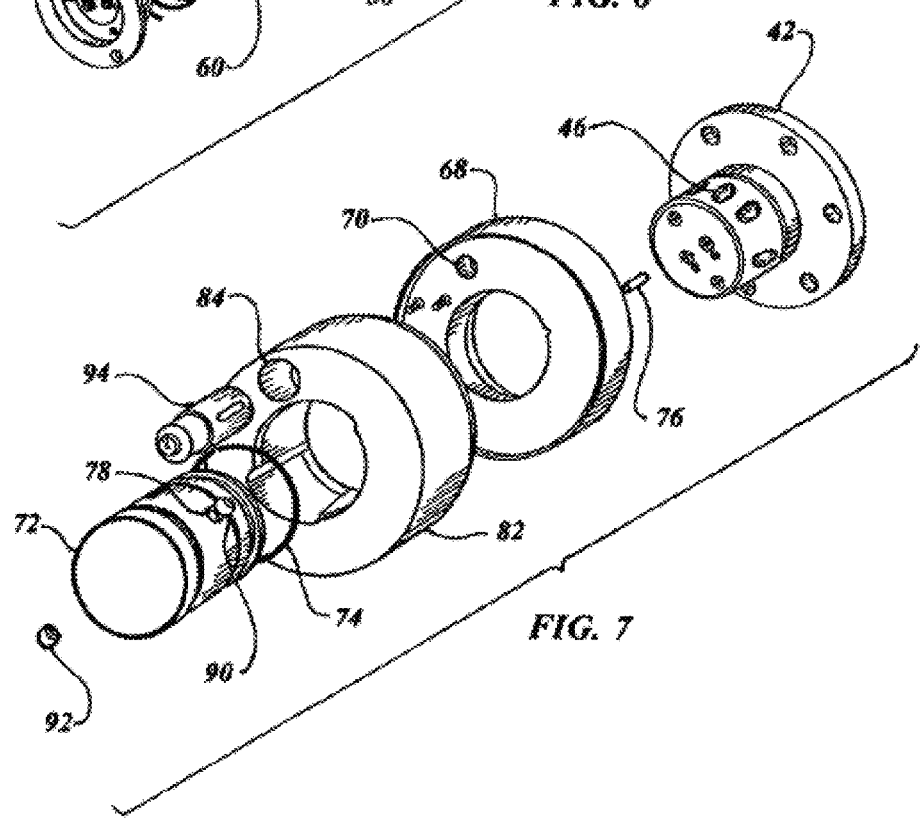
FIG. 7 exploded partial isometric view of the lock unit assembly and the mating shaft flanged hub in the preferred embodiment.
Figure 20:
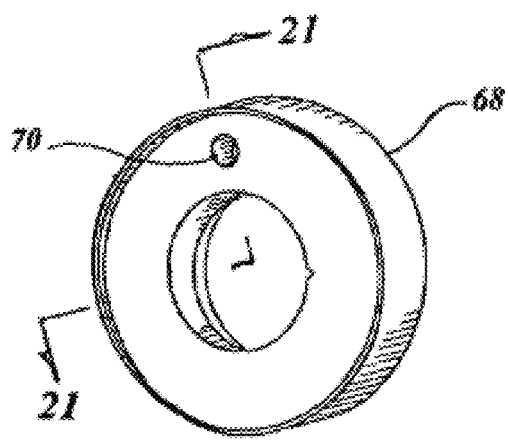
FIG. 20 is a partial isometric view of the hollow cylindrical base of the lock assembly completely removed from the invention for clarity.
Figure 21:
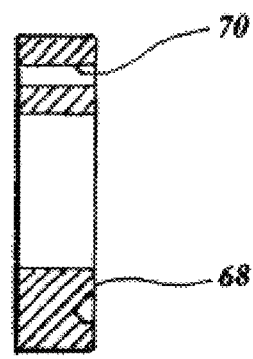
FIG. 21 is a cross-sectional view taken along lines 21-21 of FIG. 20.
Figure 22:
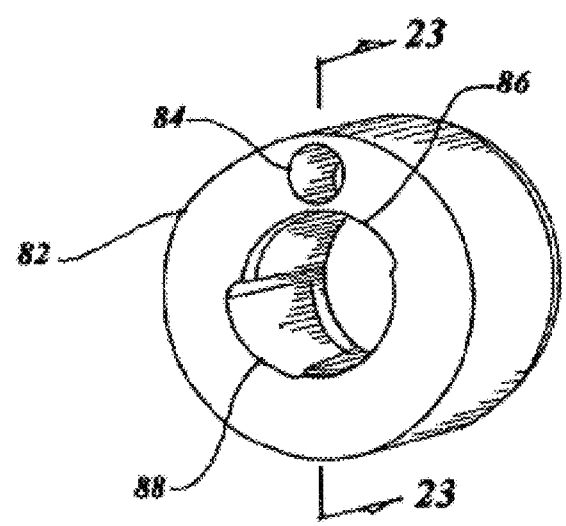
FIG. 22 is a partial isometric view of the lock outer cover completely removed from the invention for clarity.
Figure 23:
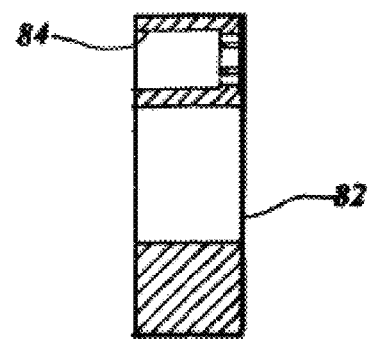
FIG. 23 is a cross-sectional view taken along lines 23-23 of FIG. 22.
Figure 24:
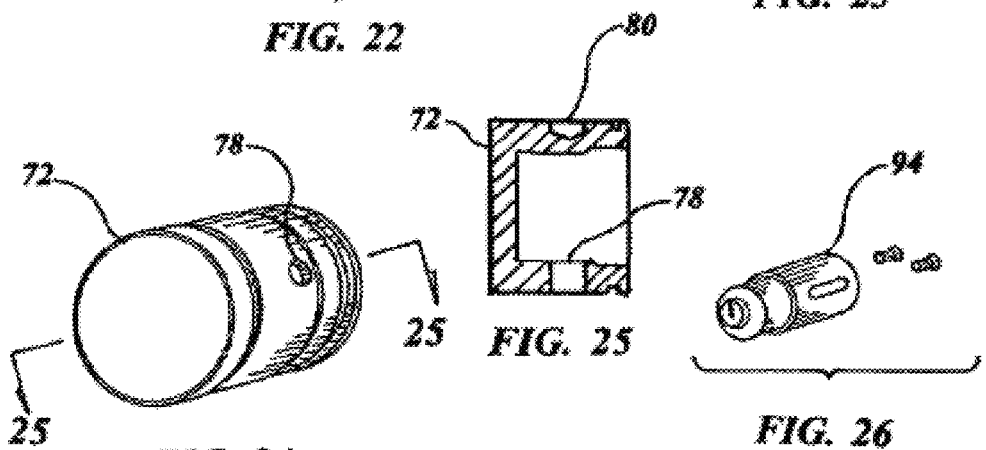
FIG. 24 is a partial isometric view of the stationary locking retainer completely removed from the invention for clarity.
Figure 25:
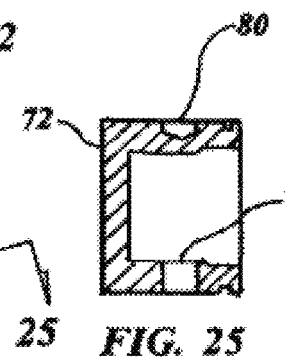
FIG. 25 is a cross-sectional view taken along lines 25-25 of FIG. 24.
Figure 26:
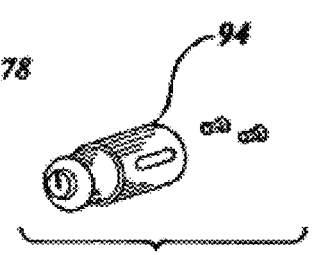
FIG. 26 is an exploded partial isometric view of the high security push bolt lock and attaching screws completely removed from the invention for clarity.
Figure 27B:
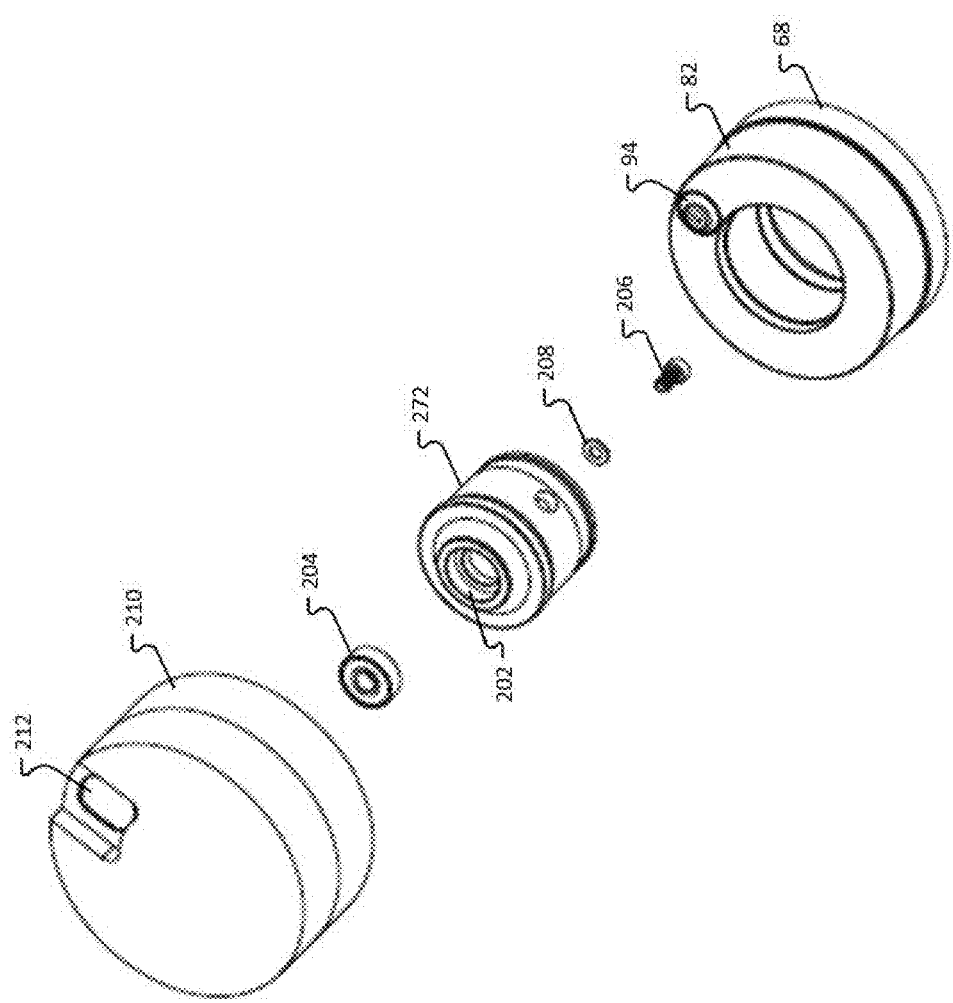
FIG. 27B is another exploded view of the lock unit of FIG. 27A.
Figure 28:
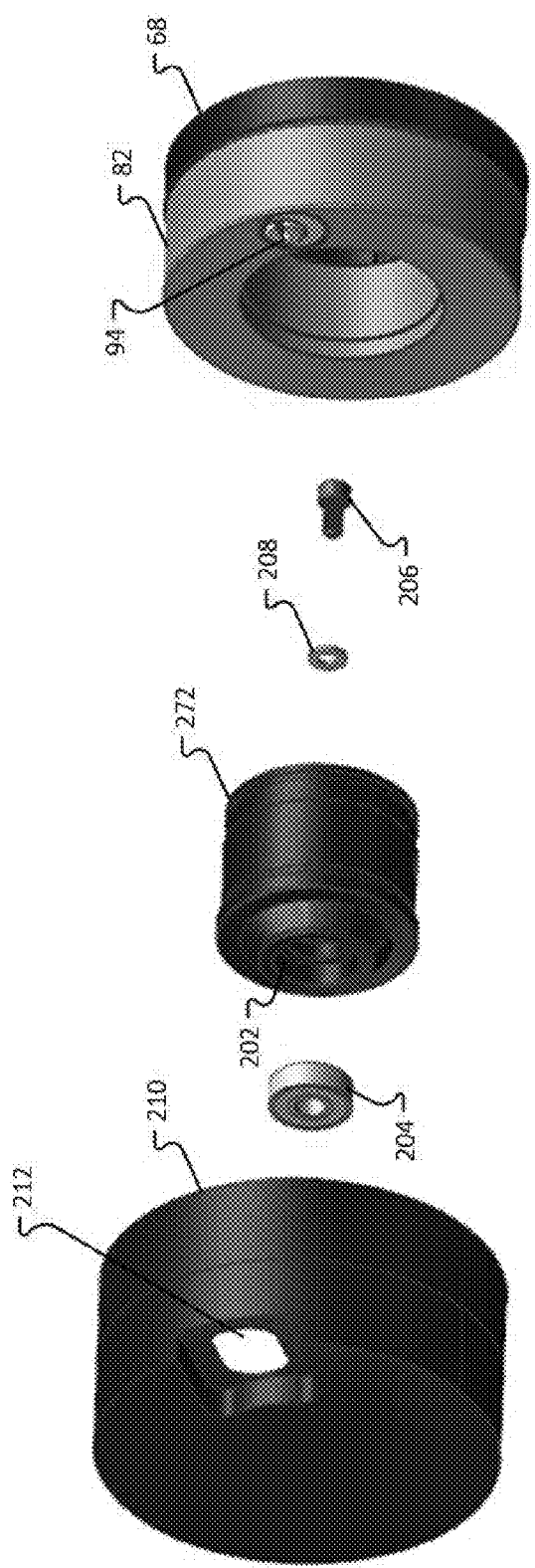
FIG. 28 is an exploded view of the lock unit of FIG. 27A from another perspective.
Figure 29A:
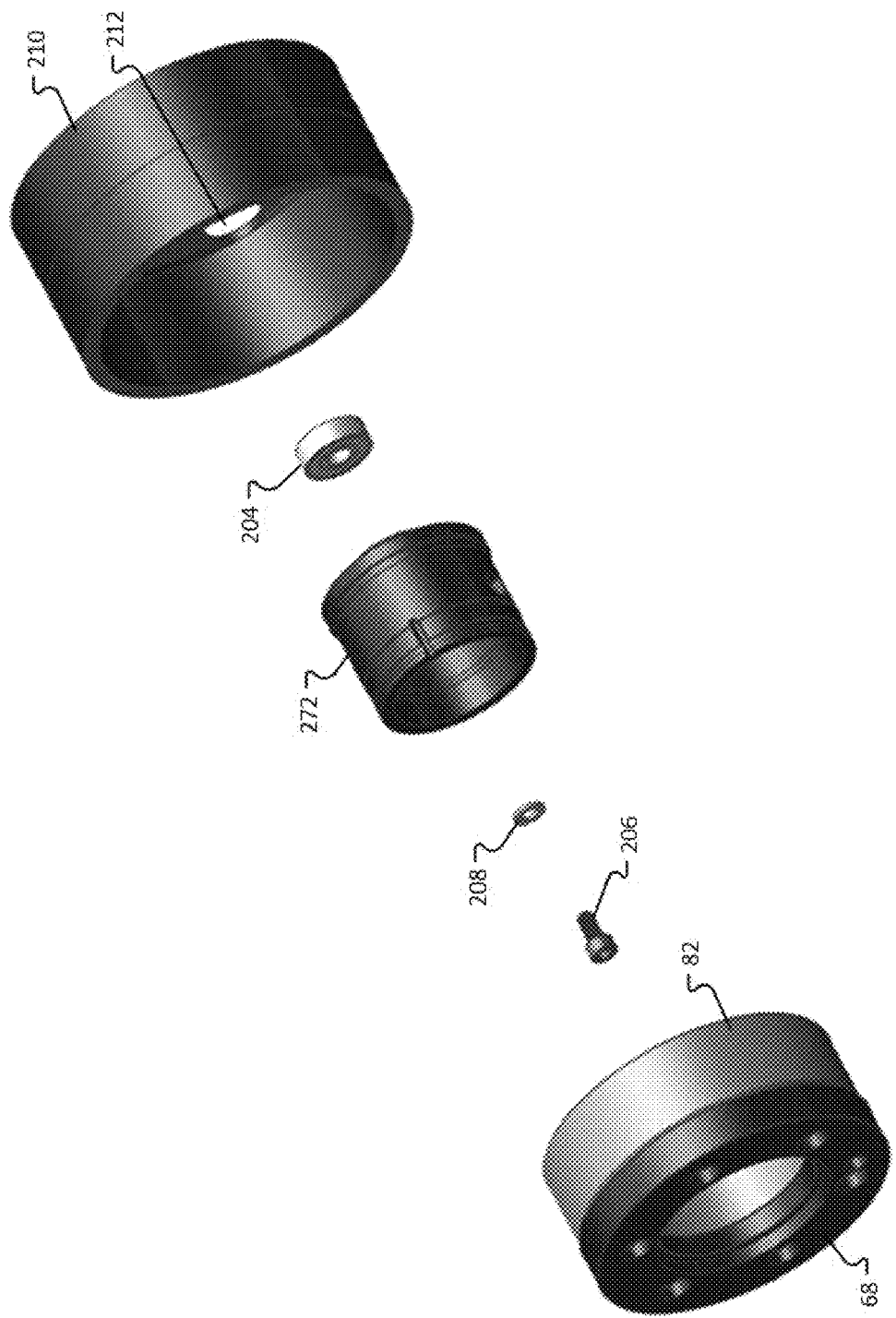
FIG. 29A is an exploded view of the lock unit of FIG. 27A from yet another perspective.
Figure 29B:
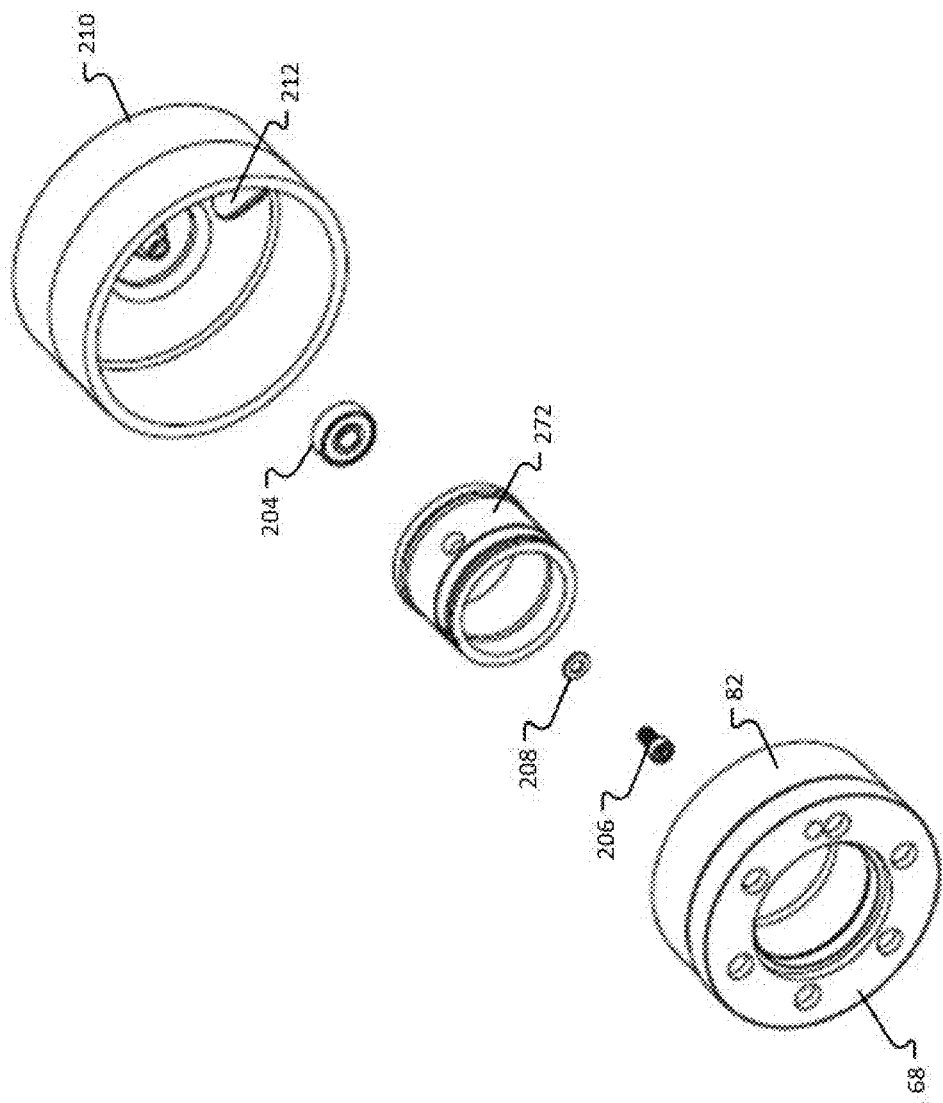
FIG. 29B is another exploded view of the lock unit of FIG. 29A.

The lock unit 24, as shown in FIGS. 5 and 7, consists of a hollow center cylindrical base 68 having a lock bolt hole 70 therethrough, as shown by itself in FIGS. 20 and 21. A cylindrical stationary locking retainer 72, as depicted alone in FIGS. 24 and 25, is disposed within the hollow center of the base 68, which is held in place with a lock ring 74 and a rotation stop pin 76, as shown in FIG. 7. The locking retainer 72 includes a single ball mounting hole 78 on a first side, and a single recessed hollow 80 on an opposed second side.

A hollow center cylindrical lock outer cover 82 is rotatably disposed onto the stationary locking retainer 72, as shown in FIG. 7. The lock outer cover 82 includes a push bolt cavity 84, an eccentric recess 86 on a first inner surface of the hollow center and an opposed concentric recess 88 on a second inner surface of the hollow center, as illustrated best in FIG. 22. The rotation stop pin 76 interfaces with the concentric recess 88 preventing compete rotation therebetween. A first round ball 90 is disposed within the locking retainer single ball mounting hole 78 and interfaces with the lock outer cover eccentric recess 86.

The lock unit 24 functions as follows: the lock unit 24 is placed over the flanged extending hub 42, after the steering wheel adapter 50 and custom steering wheel 26 have been removed. The lock outer cover 82 is then manually rotated to a locked position and the first round ball 90 is forced into one of the flanged extending hub's peripheral recessed hollows 46, thereby holding the lock unit 24 securely in place.

A second round ball 92 is disposed within the locking retainer single recessed hollow 80 and interfaces with the concentric recess 88, thereby limiting the rotational travel of the lock outer cover 82 relative to the hollow cylindrical base 68.

A high security push bolt lock 94 is disposed within the cylindrical outer cover push bolt cavity 84, with the push bolt of the lock 94 intersecting with the cylindrical base lock bolt hole 70, thus preventing rotation of the lock outer cover 82 with the cylindrical base 68 when the lock 94 is manually depressed. When locked, the attachment of the lock unit 24 to the flanged extending hub 42 is manually loaded, allowing the integrity of the lock unit 24 to be totally assured.

Electrical connection means for transferring an electrical signal from an automotive horn circuit through the quick release unit assembly 22 to a horn button on the custom steering wheel 26 are defined as utilizing the following elements and functions.

An insulated electrically-conductive slip ring 96 is incorporated into the steering shaft hub 30. A positive slip ring electrical conductor 98 is then connected to the slip ring 96, and a negative slip ring conductor 100 is connected to the steering shaft hub 30. A slip ring insulator 97 isolates the slip ring 96 from the hub 30.

An insulated contact adapter 108 is disposed within the flanged extending hub 42, as shown in FIGS. 11-13, with the insulated contact adapter 108 in electrical communication with the positive slip ring electrical conductor 98. The positive slip ring electrical conductor 98 terminates with a first positive contact pin 104, and the negative slip ring conductor 100 terminates with a first negative contact pin 106.

An insulated hub plate 102 having a second positive contact pin 110 is in electrical communication with the first positive contact pin 104, and a second negative contact pin 112 is in electrical communication with the first negative contact pin 106. An adapter positive electrical conductor 114 is attached to the second positive contact pin 110, and an adapter negative electrical conductor 116 is attached to the second negative contact pin 106, for attachment to a horn button of the custom steering wheel 26.

The ejection compression spring 48 is interfaced between the flanged extended hub 42 and the insulated contact adapter 108 that is located within the steering wheel adapter 50, which provides sufficient loading to assist in ejecting the adapter 50 with the attached steering wheel 26 when manually released.

Referring now to FIGS. 27A-29B, an improvement of the foregoing embodiment is described. A hollow center cylindrical lock outer cover 82 (e.g. a cylindrical lock outer cover comprising a central bore), comprising a push bolt lock 94, is mounted to a base 68, which also comprises a central bore. A modified cylindrical stationary locking retainer 272 is substantially similar to the cylindrical stationary locking retainer 72, but also has a cylindrical bore 202 in an upper portion thereof (e.g. on a closed end thereof) which receives a bearing 204. In the depicted embodiment, the bearing 204 is mounted to the modified cylindrical stationary locking retainer 272 with a screw or bolt 206 and a washer 208. However, the bearing 204 may be mounted to the locking retainer 272 via other methods, including, for example, by press-fit or welding. In some embodiments, the bearing 204 may not be received by a cylindrical bore 202 in the locking retainer 272, but may still be mounted to the locking retainer 272.

The cylindrical lock outer cover 82, the base 68, and the stationary locking retainer 272 define a lock unit. Although the lock 94 of the cylindrical lock outer cover 82 is described as a push bolt lock, other locking mechanisms or devices may also be used within the scope of the present disclosure.

A free-rotating keyhole cover 210 (which may also be referred to, for example, as an access cover) is mounted to the bearing 204, so as to allow free rotation of the free-rotating keyhole cover 210 around the locking retainer 272, the hollow center cylindrical lock outer cover 82, and the base 68. The free-rotating keyhole cover 210 may be mounted to the bearing 204 by any suitable means, including, for example, by press-fit, welding, adhesive, mechanical fastener, or otherwise. The free-rotating keyhole cover 210 may be permanently mounted to the bearing 204, or detachably mounted, although the free-rotating keyhole cover 210 is configured to prevent detachment thereof from the bearing 204 while locking retainer 272 is disposed within the base 68 and lock outer cover 82. The free-rotating keyhole cover 210 is primarily a cylindrical cover made of aluminum, although the design is not limited to any shape, color, weight, or material, as long as it is a free-rotating, keyhole cover attached to the stationary locking retainer 272. The keyhole cover 210 defines an interior volume sized to receive the hollow center cylindrical lock outer cover 82 and base 68.

The free-rotating keyhole cover 210 has a hole 212 therein from which the lock 94 within the cylindrical lock outer cover 82 may be accessed. However, when the free-rotating keyhole cover 210 is misaligned, the lock 94 is inaccessible via the hole 212. Further, the free-rotating keyhole cover 210—which covers up the lock outer cover 82 and the base 68, thus preventing the lock outer cover 82 and the base 68 from being gripped with pliers, a wrench, or other such tools—rotates independently of the lock outer cover 82 and the base 68, and thus of the steering column on which the lock outer cover 82 and the base 68 are installed. Consequently, only the free-rotating keyhole cover 210 is available to be grasped by a would-be thief or other wrongdoer, but the free-rotating keyhole cover 210 cannot be used to steer the vehicle. Only when a correct key 214 is inserted into the lock 94 within the cylindrical lock outer cover 82 may the free-rotating keyhole cover 210, the cylindrical lock outer cover 82, the base 68, and the stationary locking retainer 272 be connected and rotatable in unison, thus enabling removal of the steering wheel lock mechanism and subsequent connection of a steering wheel 26 to the steering shaft hub 30 via a quick release mechanism 22 attached to the steering wheel.

The foregoing discussion has been presented for purposes of illustration and description. The foregoing is not intended to limit the disclosure to the form or forms disclosed herein. In the foregoing Detailed. Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A lockable steering wheel quick-release unit for use in an automotive vehicle having a steering shaft and a steering wheel, comprising:
   a steering shaft hub having a center steering shaft bore therethrough for attachment to the automotive vehicle steering shaft, the steering shaft hub also having a plurality of flanged hub threaded mounting holes on a centrally positioned bolt circle;
   a flanged extending hub attached to the steering shaft hub, with a plurality of threaded fasteners engaging the flanged hub threaded mounting holes, the flanged extending hub having a plurality of peripheral recessed hollows therein; and
   a lock unit comprising:
      a hollow center cylindrical base having a lock bolt hole therethrough;
      a cylindrical stationary locking retainer disposed within the hollow center of the base and held in place with a lock ring and a rotation stop pin, wherein the locking retainer has a single ball mounting hole on a first side, a single recessed hollow on an opposed second side, and a bearing mounted on an end thereof;
      a hollow center cylindrical lock outer cover having a push bolt cavity therein, the lock outer cover having an eccentric recess on a first inner surface of the hollow center, and an opposed concentric recess on a second inner surface of the hollow center, with the outer cover rotatably disposed onto the stationary locking retainer;
      a first ball disposed within the locking retainer single ball mounting hole that interfaces with the lock outer cover eccentric recess, such that when the lock unit is placed over the flanged extending hub and the lock outer cover is rotated to a locked position, the first ball is forced into one of the flanged extending hub peripheral recessed hollows, and a second ball disposed within the locking retainer recessed hollow interfaces with the concentric recess, thereby limiting the rotational travel of the outer cover relative to the base;
      a lock device disposed within the push bolt cavity, with a push bolt of the lock device cooperating with the lock bolt hole to prevent rotation of the lock outer cover with respect to the cylindrical base, thereby securing the attachment of the lock unit to the flanged extending hub; and a substantially cylindrical keyhole cover having an open end configured to receive the lock outer cover and the cylindrical base, and a closed end mounted to the bearing for free rotation relative to the cylindrical stationary locking retainer, the closed end having a single aperture therein through which the lock device may be accessed.

2. The lockable steering wheel quick-release unit as recited in claim 1, further comprising:

a steering wheel adapter for attachment to the steering wheel, wherein the adapter has a plurality of peripheral ball mounting holes therethrough, with the adapter slideably engaging the flanged extending hub when the lock unit is removed from the flanged extending hub;

a plurality of round balls disposed within the adapter peripheral ball mounting holes; and a biased sliding release sleeve slideably extending over the adapter, thereby retaining the plurality of round balls such that when the sliding release sleeve is in a biased position, the plurality of round balls are forced into the flanged extending hub's peripheral recessed hollows and interface with the steering wheel adapter peripheral ball mounting holes, thus securely locking the adapter to the steering shaft hub, and when manually urged away from the vehicle steering shaft, the plurality of round balls are freed, thereby permitting movement of the plurality of round balls away from the flanged extending hub's peripheral recessed hollows and releasing the steering wheel adapter from the flanged extending hub.

3. The lockable steering wheel quick-release unit as recited in claim 1 further comprising electrical connection means for transferring an electrical signal from an automotive horn circuit through the quick-release unit to a horn button on the steering wheel defined as:

an insulated slip ring attached to the steering shaft hub, a positive slip ring electrical conductor connected to the slip ring, and a negative slip ring conductor connected to the steering shaft hub, an insulated hub plate that is disposed within the flanged extending hub in electrical communication with the positive slip ring electrical conductor terminating with a first positive contact pin, and the negative slip ring conductor terminating with a first negative contact pin, and an insulated contact adapter having a second positive contact pin in electrical communication with the first positive contact pin, and a second negative contact pin in electrical communication with the first negative contact pin, also an adapter positive electrical conductor attached to the second positive contact pin, along with an adapter negative electrical conductor attached to the second negative contact pin for attachment to a horn button of the steering wheel.

4. The lockable steering wheel quick-release unit as recited in claim 1 wherein the steering shaft hub further has at least three turn signal notches for interfacing with a vehicle indicating system.

5. The lockable steering wheel quick-release unit as recited in claim 1 wherein the steering shaft hub further has a female spline on a distal end of the steering shaft bore and a taper within the remainder of the bore.

6. The lockable steering wheel quick-release unit as recited in claim 1 wherein the steering shaft hub is constructed of powder paint coated aluminum.

7. The lockable steering wheel quick-release unit as recited in claim 1 wherein the flanged extending hub is constructed of powder paint coated aluminum.

8. The lockable steering wheel quick-release unit as recited in claim 1 wherein the plurality of round balls are steel ball bearings.

9. The lockable steering wheel quick-release unit as recited in claim 2 wherein the sliding release sleeve is constructed of anodized aluminum.

10. The lockable steering wheel quick-release unit as recited in claim 2 further comprising an ejection compression spring that is interfaced between the flanged extending hub and the steering wheel adapter wherein the spring ejects the adapter when released.

11. The lockable steering wheel quick-release unit as recited in claim 2 wherein the steering wheel adapter further comprises a captivated release pin extending from an outer peripheral surface of the adapter for releasing the quick-release unit from the steering shaft hub when the release sleeve is manually retracted over the adapter.

12. The lockable steering wheel quick-release unit as recited in claim 2 wherein the steering wheel adapter further comprises a plurality of ribs that extend outward from an outer peripheral surface to prevent wear marks from the sliding movement of the release sleeve.

13. The lockable steering wheel quick-release unit as recited in claim 2 further comprising a removal compression spring that is positioned between the steering wheel adapter and the sliding release sleeve for preventing the release of the quick-release unit until manually actuated.

14. The lockable steering wheel quick-release unit as recited in claim 2 wherein the steering wheel adapter further comprises a horn button support ring.

15. The lockable steering wheel quick-release unit as recited in claim 2 wherein the steering wheel adapter is constructed of powder paint coated aluminum.

16. A locking device comprising:

a cylindrical base comprising a first central bore and a separate lock bolt hole;

a lock outer cover comprising a second central bore and a separate push bolt cavity therein, the lock outer cover configured to be removably attached to the cylindrical base with the second central bore in axial alignment with the first central bore;

a stationary locking retainer disposed within the first and second central bores, the locking retainer comprising a first open end and a first closed end, and further comprising a bearing mounted on the first closed end;

a lock mechanism disposed within the push bolt cavity, with a push bolt of the lock mechanism cooperating with the lock bolt hole to prevent rotation of the lock outer cover with respect to the cylindrical base; and a keyhole cover comprising a second open end and a second closed end, the second closed end mounted to the bearing for free rotation relative to the stationary locking retainer, wherein the keyhole cover defines an interior volume sized to receive the lock outer cover and the cylindrical base, and further wherein the closed end comprises a single aperture through which the lock mechanism may be accessed.

17. The locking device of claim 16, wherein the locking device further comprises:

a steering shaft hub comprising a center steering shaft bore therethrough for attachment to an automotive vehicle steering shaft, the steering shaft hub also comprising a plurality of flanged hub threaded mounting holes on a centrally positioned bolt circle; and a flanged extending hub attached to the steering shaft hub, with a plurality of threaded fasteners engaging the flanged hub threaded mounting holes, the flanged extending hub having a plurality of peripheral recessed hollows therein.

18. The locking device of claim 16, wherein the stationary locking retainer comprises a single ball mounting hole on a first side, a single recessed hollow on an opposed second side, and a first ball disposed within the single ball mounting hole, and further wherein the first ball is configured to selectively engage an internal feature of the lock outer cover when the locking retainer is mounted on the flanged extending hub.

19. A steering shaft locking device, comprising:

a cylindrical lock unit configured to be mounted over an end of an automotive steering shaft and locked into position, the cylindrical lock unit comprising:

an open end configured to extend over the automotive steering shaft, a closed end, a bearing mounted to the closed end, and a locking mechanism for selectively locking the cylindrical lock unit into position; and an access cover mounted to the bearing, the access cover extending over the cylindrical lock unit from the closed end to the open end and configured to rotate freely around the cylindrical lock unit, wherein the access cover comprises an aperture through which the locking mechanism may be selectively accessed by rotating the access cover until the aperture is aligned with the locking mechanism.

20. The steering shaft locking device of claim 19, wherein the locking mechanism is a push bolt locking mechanism operable by a key.

\* \* \* \* \*